INVENTOR.
JOHN GORDON BAKER
BY John L. Diehl
ATTORNEY

JOHN GORDON BAKER *INVENTOR*

BY John M. Diehl

ATTORNEY

March 15, 1966 J. G. BAKER 3,239,928

METHOD OF ASSEMBLING A FLOAT IN A TANK

Filed Sept. 8, 1961 14 Sheets-Sheet 3

JOHN GORDON BAKER *INVENTOR*

BY John M. Diehl

ATTORNEY

March 15, 1966 J. G. BAKER 3,239,928

METHOD OF ASSEMBLING A FLOAT IN A TANK

Filed Sept. 8, 1961 14 Sheets-Sheet 4

INVENTOR.
JOHN GORDON BAKER
BY John M. Diehl
ATTORNEY

March 15, 1966 J. G. BAKER 3,239,928

METHOD OF ASSEMBLING A FLOAT IN A TANK

Filed Sept. 8, 1961 14 Sheets-Sheet 5

JOHN GORDON BAKER *INVENTOR*

BY [signature]

ATTORNEY

March 15, 1966 J. G. BAKER 3,239,928

METHOD OF ASSEMBLING A FLOAT IN A TANK

Filed Sept. 8, 1961 14 Sheets-Sheet 6

JOHN GORDON BAKER *INVENTOR*

BY John M. Diehl

ATTORNEY

JOHN GORDON BAKER *INVENTOR*

BY John M. Diehl

ATTORNEY

METHOD OF ASSEMBLING A FLOAT IN A TANK

Filed Sept. 8, 1961

JOHN GORDON BAKER *INVENTOR*

*BY* John Em. Diehl

ATTORNEY

METHOD OF ASSEMBLING A FLOAT IN A TANK

Filed Sept. 8, 1961 14 Sheets-Sheet 9

INVENTOR.
JOHN GORDON BAKER
BY
ATTORNEY

March 15, 1966 J. G. BAKER 3,239,928

METHOD OF ASSEMBLING A FLOAT IN A TANK

Filed Sept. 8, 1961 14 Sheets-Sheet 10

INVENTOR.
JOHN GORDON BAKER
BY
ATTORNEY

INVENTOR.
JOHN GORDON BAKER
BY John G. Diehl
ATTORNEY

INVENTOR.
JOHN GORDON BAKER
BY John L. Diehl
ATTORNEY

March 15, 1966 J. G. BAKER 3,239,928

METHOD OF ASSEMBLING A FLOAT IN A TANK

Filed Sept. 8, 1961 14 Sheets-Sheet 13

INVENTOR.
JOHN GORDON BAKER
BY John L. Diehl
ATTORNEY

INVENTOR.
JOHN GORDON BAKER
BY John L. Diehl
ATTORNEY

United States Patent Office 3,239,928

Patented Mar. 15, 1966

3,239,928

METHOD OF ASSEMBLING A FLOAT IN A TANK

John Gordon Baker, Evansville, Wis., assignor to Baker Manufacturing Company, Evansville, Ind.

Filed Sept. 8, 1961, Ser. No. 136,875
5 Claims. (Cl. 29—433)

This invention relates to a method of introducing a float for separating the gas from the liquid in a hydraulic accumulator which contains both liquid and gas and more particularly to such a float which may be introduced into the accumulator through a small aperture. Such separation reduces the rate of absorption of the gas by the liquid and thus prolongs operation of the accumulator before recharging with gas becomes necessary.

The float assembled by the method of this invention is particularly adapted for use in a water-air accumulator such as may be used in water supply systems. The tanks of such accumulators are commonly fabricated by welding and are usually permanently closed except for relatively small tapped holes provided for pipe and accessory connections. A corrosion resistant coating is usually applied to the tank inside and out.

Prior art floats for use with such accumulators are relatively rigid unitary structures and therefore must necessarily be inserted before completion of the tank fabrication. Obviously, such floats can neither be inserted into nor withdrawn from an existing tank. Furthermore, the use of such floats places important limitations on the type of corrosion resistant coating that can be applied to the accumulator tank after fabrication both because the float obstructs the coating process and the float materials commonly used so limit the temperature to which the tank may be subjected as to preclude the use of such coating processes as hot dip galvanizing, glass lining and baked enameling.

A general object of this invention is to provide a method of installing a float in an existing accumulator to provide the advantages of a float while avoiding the cost of a new accumulator and avoiding any limitations on the design, fabrication and coating of the tank.

A second object is to provide a method of installing a float in an existing liquid-gas accumulator tank that is rigid enough to sustain the pressures within the accumulator without appreciable contraction or distortion which would result in excessive ventilation of the liquid surface between the edge of the float and the wall of the tank.

A third object of this invention is to provide a method of installing a float made of parts each sufficiently small in maximum cross section to be inserted into an accumulator tank through a hole ordinarily provided for another purpose.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
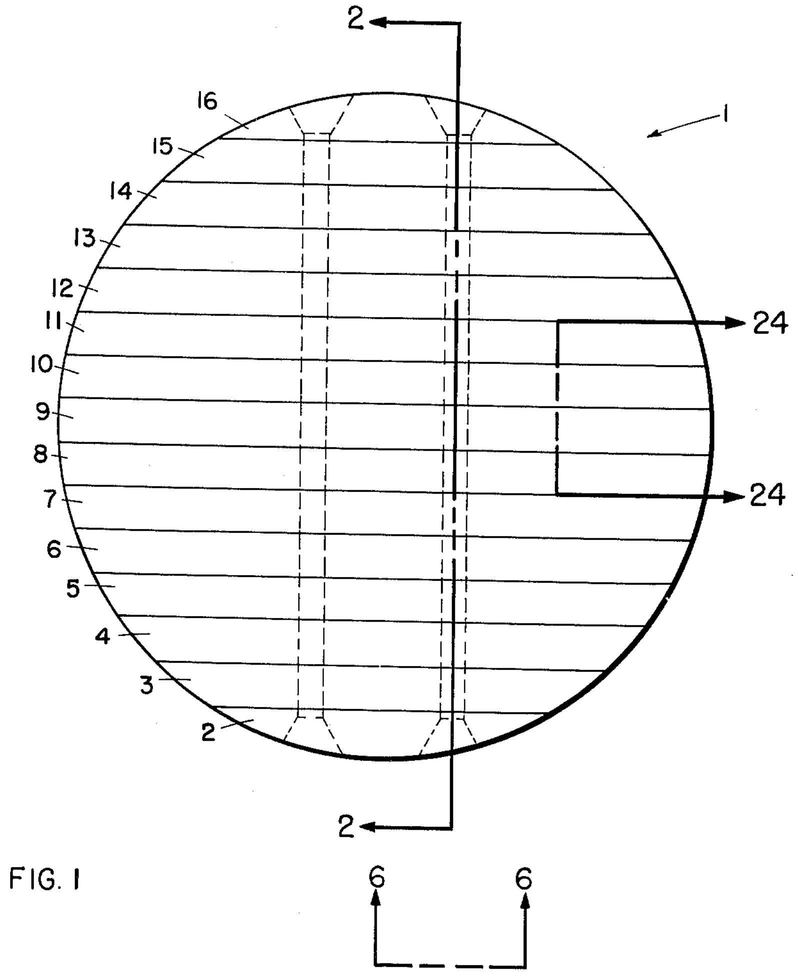
FIGURE 1 is a plan view of a preferred embodiment of the float structure of the invention.
Figure 2:
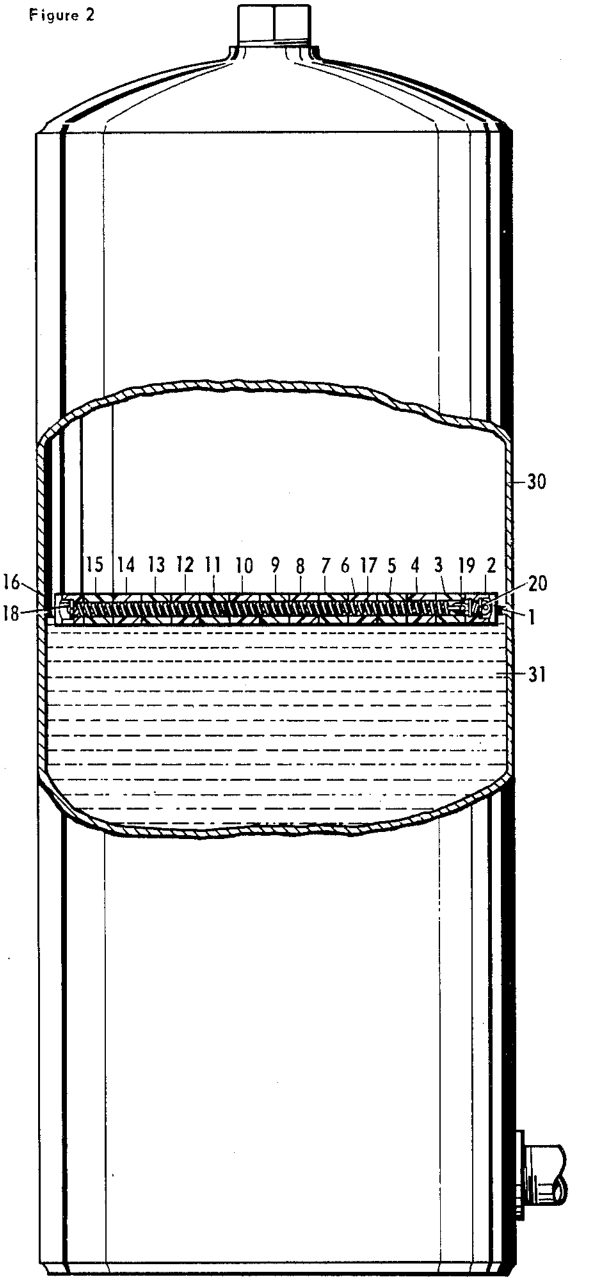
FIGURE 2 is a cross-sectional view of the float of FIGURE 1 taken on line 2—2 of FIGURE 1, in a tank which is cut away to show the float.
Figure 3:
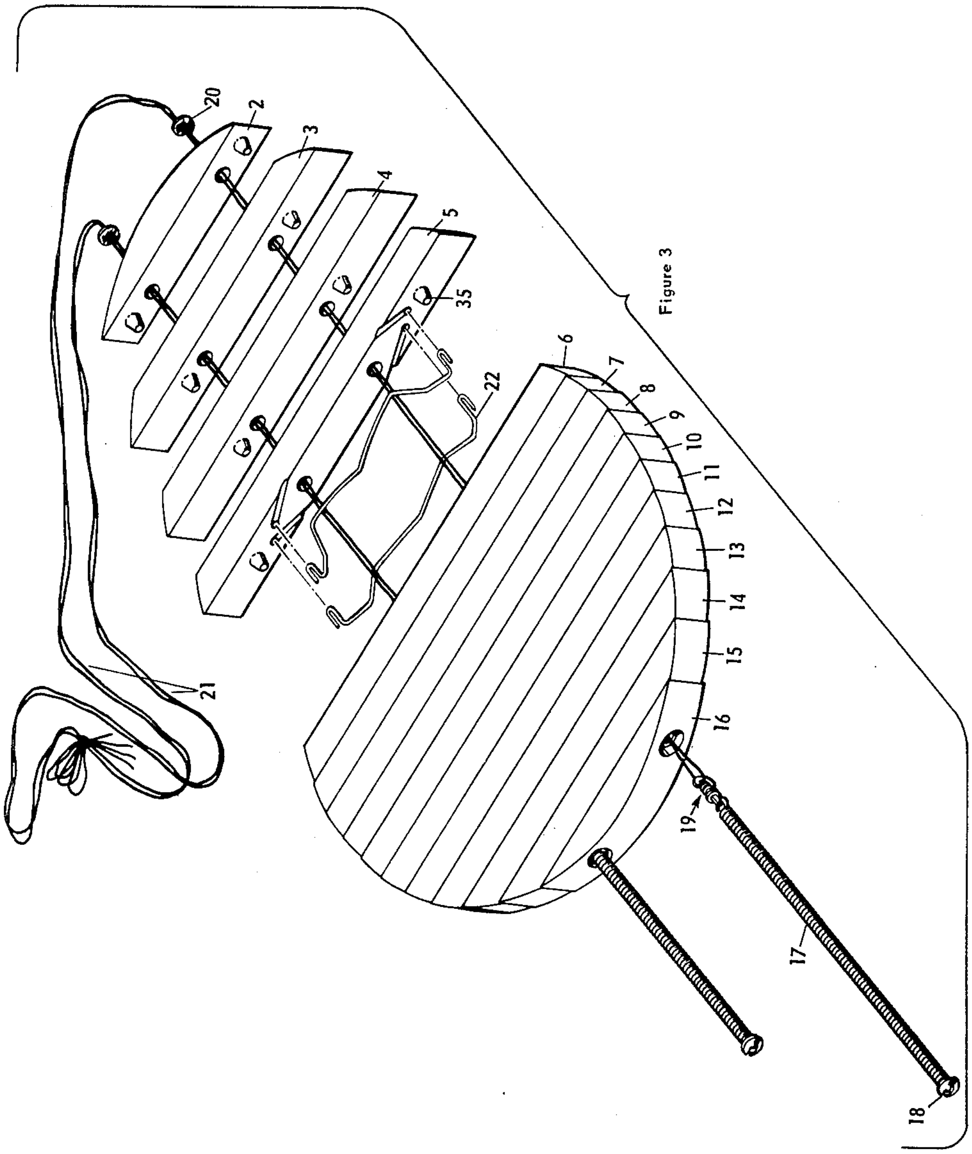
FIGURE 3 is an exploded perspective view of the embodiment of FIGURES 1 and 2.

As shown in FIGURE 1, a float in accordance with the invention, indicated generally as 1 may comprise elongated float members 2, 3, 4, 5, 6, 7, 8, 9, 10, 11, 12, 13, 14, 15 and 16, and as may be seen from FIGURES 1, 2 and 3, each of these members may extend from an outer peripheral portion of the float to another outer peripheral portion of the float; each is elongated; each may be considered as having an axis; the axes of all the members are parallel; each of members 3 to 15 may have a portion which is intermediate those portions which are at outer peripheral edges of the float; such portions may be of equal width and constant cross-section throughout their length, and the width of such portions may be equal in all members.

As shown in FIGURE 2, float 1 may float on the surface of water 31 in tank 30; preferred clearance between the outer peripheral edge of the float and the internal surface of the sidewall of tank 30 is 1/32 inch to 1 inch. As may be seen from FIGURES 2 and 3, members 2 to 16 may be held together by resilient means such as coiled springs 17 which may hold the members in place by reason of washer-like retaining means 18 fastened to one end of each of the springs, and spring-like means 19 which may have locking washers 20 engaged therewith.

Figure 4:
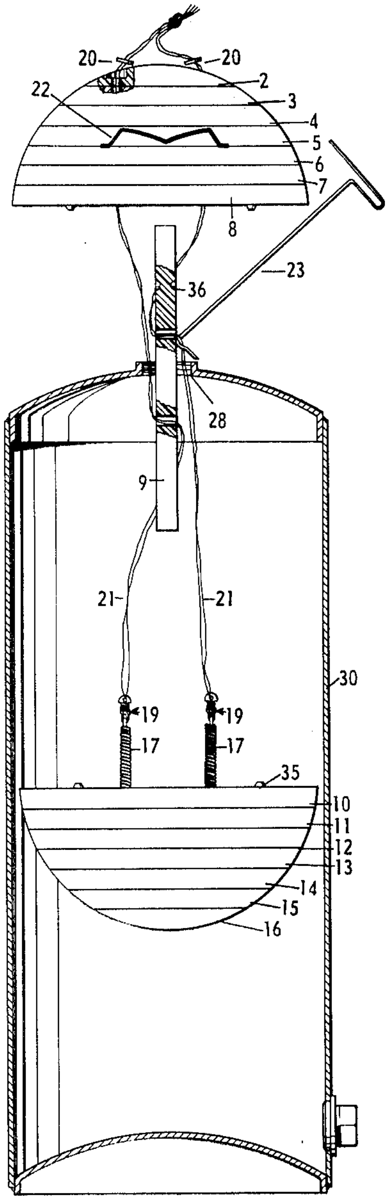
FIGURE 4 is a cross-sectional partially cutaway view of a step in installing the embodiment of FIGURE 1 in a tank.
Figure 5:
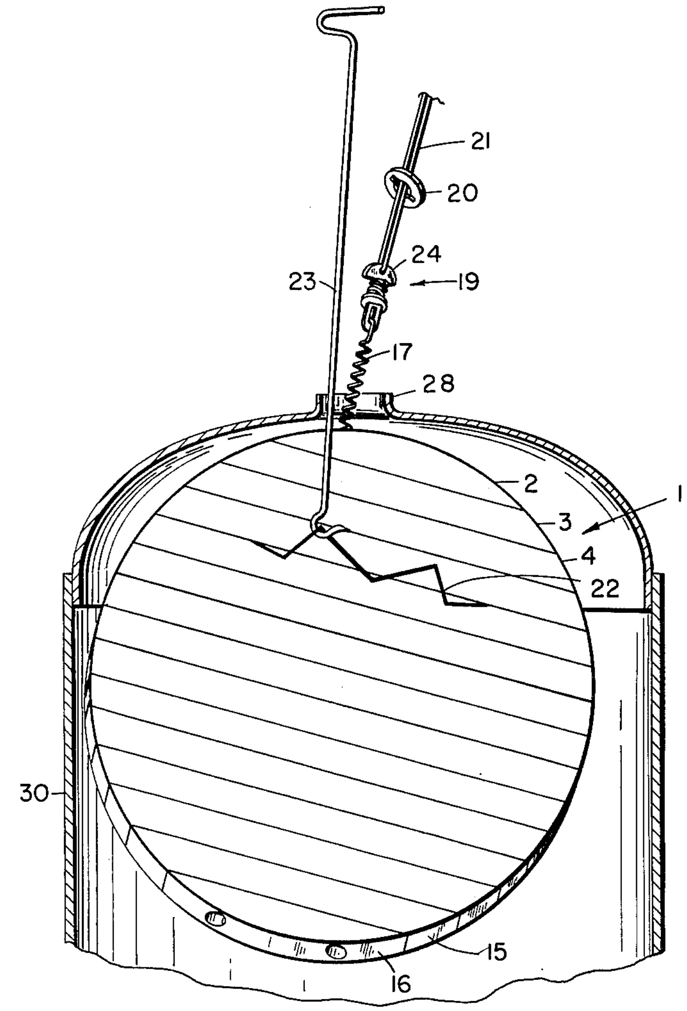
FIGURE 5 is a partially cross-sectional cutaway perspective view of another step in installing the embodiment of FIGURE 1 and 2 in a tank.

As shown in FIGURES 3, 4 and 5, the float may be provided with lifting members 22 which may be engaged with a float member such as float member 5 and may be made of wire, preferably of stainless steel wire. Members 22 provide means whereby the float may be removed from the tank as shown in FIGURES 4 and 5 and described hereinafter in connection with FIGURES 3, 4 and 5.

Figure 7:
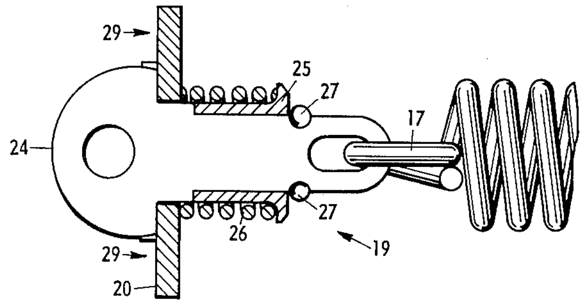
FIGURE 7 is a fragmentary cross-sectional view taken on line 7—7 in FIGURE 6.
Figure 6:
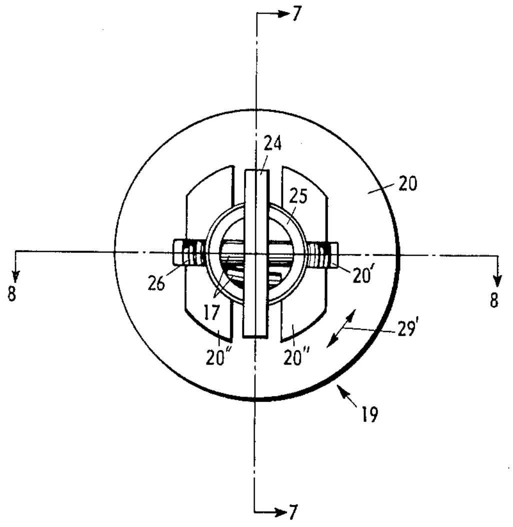
FIGURE 6 is an enlarged fragmentary elevation taken from the point of view of line 6—6 in FIGURE 1.
Figure 8:
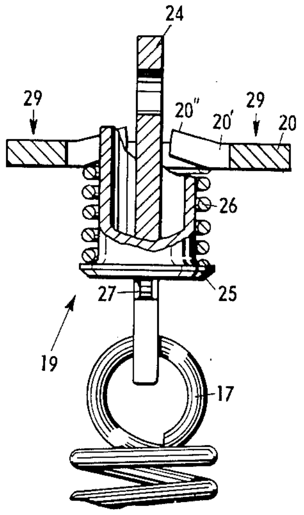
FIGURE 8 is a fragmentary partially cross-sectional partially cutaway view taken on line 8—8 in FIGURE 6.

Spring-lock members 19, as shown in FIGURES 6, 7 and 8, may comprise lock member 24, which may be encircled by spring locating and retaining collar 25, which may retain in place resilient means such as compression coil spring 26. Member 25 may be retained on member 24 by any suitable means such as staking or indenting at 27. Locking washer member may be engaged with member 24 as shown or may be disengaged by pushing it in the direction indicated by arrows 29 while holding member 24 stationary, thereby compressing spring 26 to disengage upstanding portions 20″ of washers 20 from upper outwardly extending portions of member 24. Member 20 may then be rotated 90 degrees in either direction as indicated by arrow 29′ whereupon slots 20′ register with the laterally extending portions of the top of member 24 and make possible removal of washers 20 from members 19 as indicated in FIGURE 3.

Likewise, each of washers 20 may be installed by placing it over the top of 24 with slots 20′ in registry with the top of member 24 as indicated in FIGURE 5 and then pressing downwardly as indicated by arrows 29 and rotating 90 degrees in either direction as shown by arrow 29′ to bring it into the position indicated in FIGURE 6 and then releasing it, whereupon it is driven upward by spring 26 against the outwardly extending portions of the top of member 24. If it is then rotated (for example accidentally) without being depressed as indicated by arrows 29, portions 20″ engage the outwardly extending portions of member 24 to stop further rotation and prevent its removal.

Float 1 may be introduced from the exterior of tank 30 into the interior of tank 30 through a hole such as aperture 28 which has an internal diameter which is relatively small with respect to the major lateral internal dimension of the tank, that is, the internal diameter of the cylindrical tank as it is shown. Water 31 is preferably removed from tank 30 during the installation.

Aperture 28 may be in one end of the tank as shown or may be in one side of the tank; if it is in one side of the tank, the tank is preferably tilted so that it is not vertical during installation. Thus, it may conveniently be installed in substantially any completely assembled tank which is normally used as an accumulator in conventional water systems.

Such introduction, to provide an installed float as shown in FIGURE 2 is accomplished as shown most particularly in FIGURES 4 and 5, by attaching strings such as strings 21 to members 24. It is preferred to insert one end of each of two strings through the hole provided in each of members 24 and then pull each of the strings through the hole to provide a double string as shown in FIGURE 3. However, one end of each string may be tied to member 24. Washers 20 are then released from members 19; springs 17 may then be withdrawn from the float as indicated in FIGURE 3 and then, while all of the float members are retained outside of the tank, the springs may be lowered through hole 28 into the interior of tank 30 so that they have the position as shown in FIGURE 4 with much of each of strings 21 extending into the interior of tank 30. Member 16 is then separated from the other members and rotated to extend upwardly and downwardly in hole 28 in somewhat the position of member 9 as shown in FIGURE 4 and is then inserted or threaded downwardly through hole 28 in the manner shown with respect to member 9 in FIGURE 4. Strings 21 may be lowered while member 16 is being lowered or they may be pulled through the laterally extending holes in member 16, through which they extend as shown with respect to member 9. Member 20 is then allowed to slide downwardly on strings 21 and thence on springs 17 until it is caught by and retained on members 18 which extend laterally at the bottom of springs 17. Each succeeding member is then installed in the same way, members 15, 14, 13, 12, 11 and 10 being installed in that order, member 9 being installed as shown in FIGURE 4 and then members 8, 7, 6, 5, 4, 3 and 2 being installed in the same manner shown for member 9 and described above with respect to member 16. As an alternate procedure, springs 17 may be withdrawn only from members 15 to 2, thus leaving springs 17 extending through member 16, and the springs and member 16 may be inserted through aperture 28 together by bending springs 17 so that the portions which are not within member 16 lie along surfaces of member 16. Member 15 may then be inserted in the manner described for member 16 and shown for FIGURE 9 and the other members may then be successively installed in the same manner.

By then pulling upward on one of strings 21, the float members may be drawn into the position shown in FIGURE 5 and spring 17 may be stretched to withdraw spring lock device 19 through hole 28, out of the tank to the position shown in FIGURE 5. Washer 20 may then be installed on member 19 as described hereinabove and spring 17 may then be allowed to contract until washer 20 engages member 2 as shown in FIGURE 2. Spring 17 then remains stretched to the extent shown in FIGURE 2 and thus biasedly urges members 2–16 together to provide float 1. It may be noted from a comparison of FIGURES 3 and 4 with FIGURE 2, that the spring 17 is somewhat stretched in FIGURE 2, the space between coils being somewhat more open and spring 17 being longer in FIGURE 2 than in FIGURES 3 and 4 wherein the coils are closer to each other. The same procedure is carried out with respect to each of springs 17. Strings 21 may then be detached from members 24; if strings 21 are doubled as preferred, this may be accomplished by releasing one end of each string and pulling the other end. However, if ends of strings 21 are tied to members 24, they may be untied by reaching through aperture 28 to do so or may be cut loose from member 24 by extending a knife through aperture 28 to cut them loose from member 24. The float then drops back into the tank and when water is introduced into the tank, the float is supported thereby as shown in FIGURE 2. All of the objects set forth above are thereby accomplished.

It may be seen that a lateral hole is provided in each of the float members to receive springs 17, the lateral holes in the members combining to provide two lateral holes extending through the float from one outer peripheral edge to a substantially opposite peripheral edge.

In order to provide a smooth outer peripheral edge and avoiding extending projections therefrom, the lateral holes in members 2 and 16 may be recessed to receive members 18 and 20, as shown.

One or more projections 35 may extend into depressions 36 to aid in maintaining members 2–16 and 2′–16′ in alignment in order to provide the top and bottom of the float as substantially flat, such substantial flatness being preferred for the top and especially for the bottom.

Tool 23 is not used in any of the above described steps. Tool 23 may be used to remove float 1 from tank 30. To accomplish such removal, any water which may be present in the tank is preferably allowed to remain and tool 23 is extended through aperture 28 and engaged in member 22 and then pulled upward whereby float 1 is drawn into the position indicated in FIGURE 5. A string such as string 21 is then attached to member 24; member 19 is then withdrawn to the position as shown in FIGURE 5; washer 20 is disengaged therewith as shown in FIGURE 5 and tension on string 21 is then released to release spring 17 to let it extend downwardly into the tank. The process is then repeated with respect to the other spring while member 23 is engaged with the other upwardly extending portion of member 22. The bottom end of removal tool 23 is then hooked around either spring 17 or string 21 below member 2 and member 2 is withdrawn through hole 28 in the manner shown for member 9 in FIGURE 4. Each successive member is then successively withdrawn in this manner.

Referring now to FIGURES 9–14, wherein is shown another embodiment, a float which may be indicated generally as 1′ may comprise members 2′, 3′, 4′, 5′, 6′, 7′, 8′, 9′, 10′, 11′, 12′, 13′, 14′, 15′ and 16′ which may be held together by tension members such as bolts 17′ which may be threadedly engaged with internally threaded members 18′ which may be retained or inserted in member 16′ as shown so that parts 20′ (which may be washers or may be projecting portions of the heads of bolts 17′) are engaged with member 2′. The members 2′ to 15′ may be inserted in tank 30 through hole 28 by utilizing elongated rigid member 40 which comprises member 41 having a bend at 41′ and member 42 which is substantially parallel to the lower portion of member 41 and attached thereto by link 43, pivotally attached at points 45, and latch member 44 which provides a latch and also serves as a link, being pivotally connected to members 41 and 42 at points 47. Member 40 is inserted through laterally extending rectangular holes 39 in each of the members so that the members have the position shown for members 2′ to 8′ in FIGURE 9. Each member is then rotated with respect to member 40 so that it extends upwardly and downwardly along member 41 as indicated for member 9′ in FIGURE 9. Member 40 is then lowered until the member such as member 9′ is within the tank whereupon the member is released to cause it to slide down member 40 and take the position shown for members 10′ to 16′ in FIGURE 9. Member 16′ is first caught and retained by latch member 44, members 42, 43 and 44 being retained in the position shown in FIGURE 9 with respect to member 41 by any suitable means (not shown for simplicity), such as by a string attached to pivot pin 45 and extending upwardly along member 40 or by one or more friction washers at joints 45. When all of the members have been installed and have the position shown for members 10′ to 16′, bolts 17′ may be installed by raising member 40 and placing a portion of member 41 against one side of hole 28 so that the laterally extending hole in member 2′, in which member 17′ is received, is underneath aperture 28. After one of the members 17′ is installed, the other may be installed by shifting the position of member 41 upward or downward until a different portion is against the side of hole 28 and the other one of the holes in member 2′ which receives one of members 17′ is below a portion of hole 28.

Figure 16:
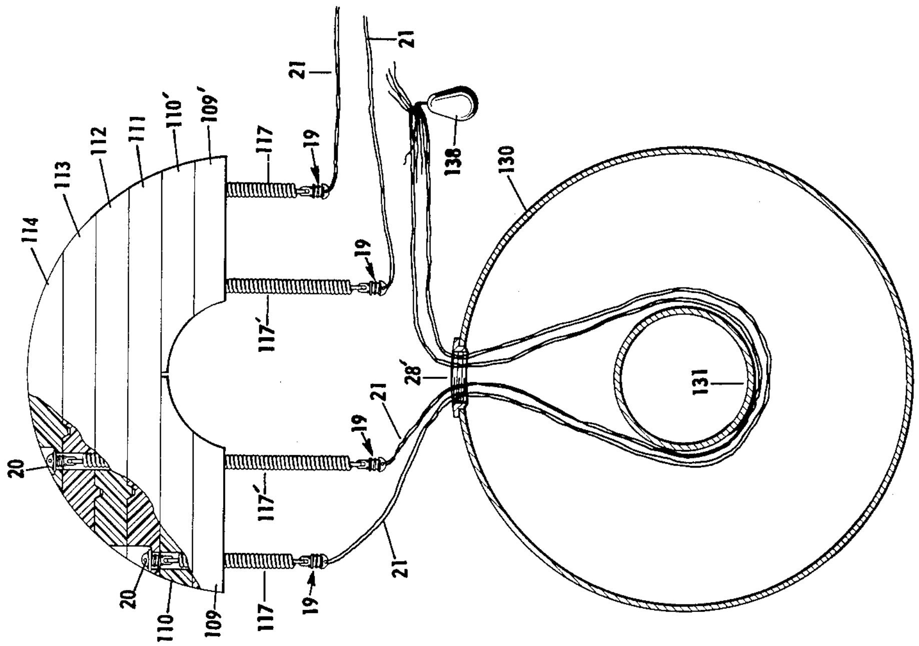
FIGURE 16 is a view corresponding to that of FIGURE 15 showing one step in the installation of the embodiment of FIGURE 15.
Figure 15:
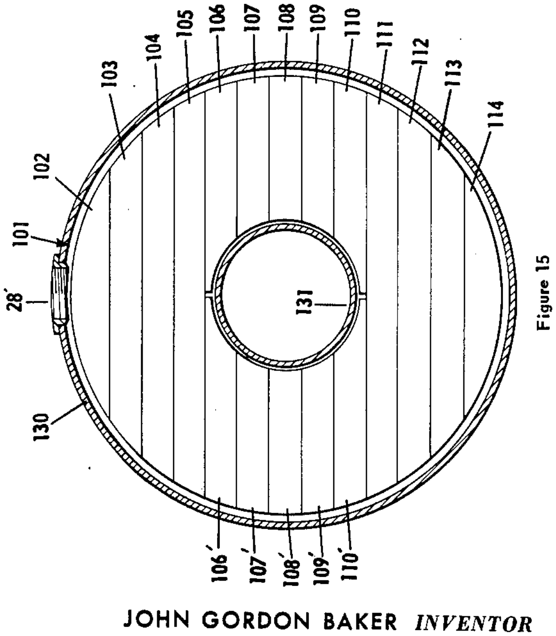
FIGURE 15 is a partially cross-sectional plan view of another embodiment.
Figure 18:
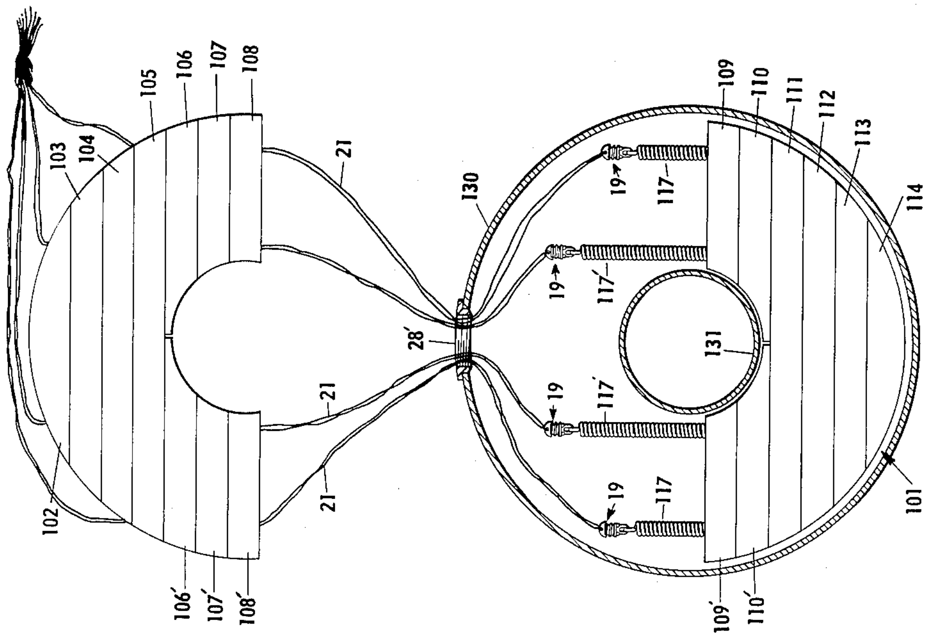
FIGURE 18 is a view corresponding to that of FIGURE 15 showing another step in the installation of the embodiment of FIGURE 15.
Figure 17:
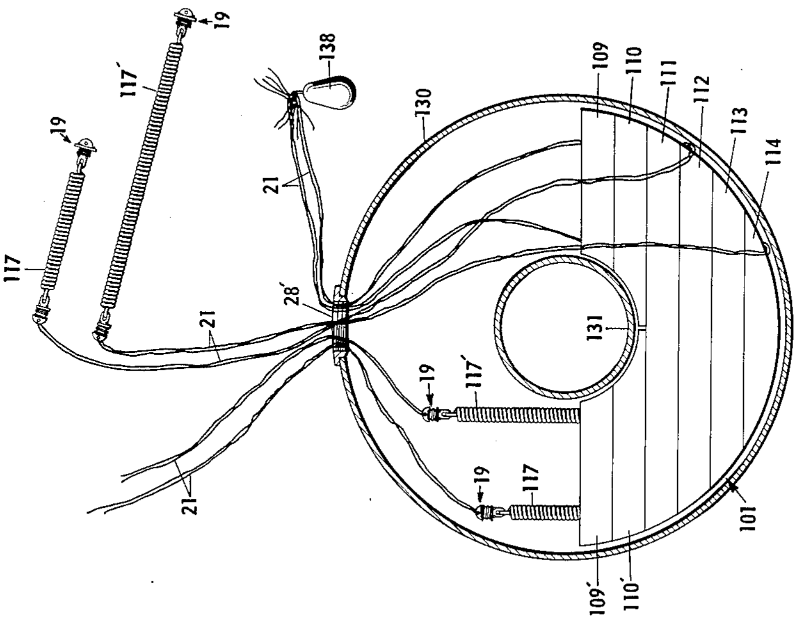
FIGURE 17 is a view corresponding to that of FIGURE 15 showing another step in the installation of the embodiment of FIGURE 15.

Some tanks which may be used as pressure vessels or hydraulic accumulators and in which the apparatus of the invention may be used have tubes extending through the center. Thus the invention may be applied to tank 130 having central tube 131 as shown in FIGURES 15, 16, 17 and 18; members 102 to 114 and 106′ to 110′ may correspond to members 2–16, being provided with lateral holes to receive springs 117 and 117′ which may be provided with members 18 (not shown for simplicity) and members 19 as shown. Certain of members 102 to 114 may be suitably recessed to provide a smooth outer peripheral edge and all may be provided with projections 35 and recesses 36, not shown for simplicity. Laterally extending holes to receive the springs may be provided as shown in FIGURE 16. Each of members 102 to 105 and 111 to 114 extend from one outer peripheral edge portion to another outer peripheral edge portion. Members 106 to 110 and 106′ to 110′ extend from an outer peripheral edge to an inner peripheral edge. The ends of strings 21 are preferably tied together and weight 138 is preferably attached thereto. To install float 101, weight 138 is first dropped through hole 28 and tank 130 is then rotated so that weight 138 passes around tube 131 within tank 130 and falls out hole 28 so that the parts may be arranged as shown in FIGURE 16. Then the float members 102–114 and 106′–110′ as shown in FIGURE 16 are installed in the manner shown and described in connection with FIGURE 4 until they have the position shown in FIGURE 17. Then the members are provided in the position shown in FIGURE 18, and those members outside the tank are installed in the manner described in connection with FIGURE 4 so that they are inside the tank and have the position shown in FIGURE 15, whereupon washers 20, not shown for simplicity, are installed on members 19 and strings 21 removed in the manner described in connection with FIGURE 5.

Figure 19:
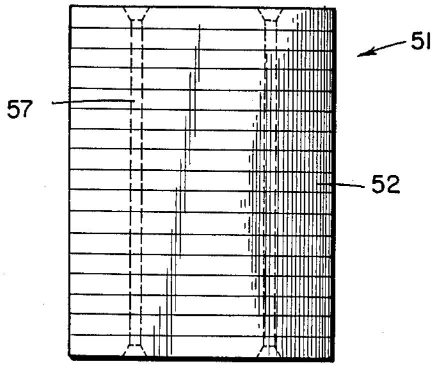
FIGURE 19 is a plan view of a modification of the embodiment of FIGURE 1.

Referring now to FIGURE 19, a float 51 in accordance with the invention may be adapted for use in a rectangular tank and may comprise a plurality of individual members 52 which may be held together to form float 51 by tension members indicated by broken lines 57. Members 52 are elongated members which extend from one peripheral edge to an opposite peripheral edge of the float and have substantially constant cross-sections and have axes, all of which are parallel.

Figure 20:
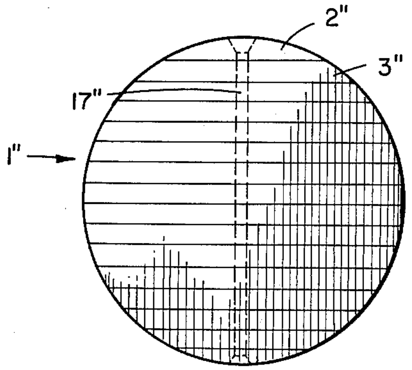
FIGURE 20 is a plan view of another modification of the embodiment of FIGURE 1.

In FIGURE 20, there is shown a modification of the float of FIGURE 1 wherein members 2″, 3″, etc. constitute float 1″, which is maintained in assembled form by the single tension member indicated by broken lines 17″. In installing float 1″ it is necessary to provide external guides, such as wires (not shown) extending downward through hole 28 to cause the axis of each member to be parallel to the axis of the next preceding member after each member is inserted through the hole, and it is desirable to provide means such as projections and recesses 35 and 36 (not shown for simplicity) to maintain the members in the desired alignment after installation.

Figure 21:
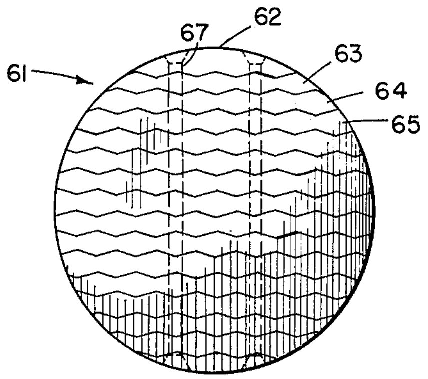
FIGURE 21 is a plan view of another modification of the embodiment of FIGURE 1.

As shown in FIGURE 21, a float 61 may be provided by a plurality of members such as 62, 63, 64 and 65, each of which is elongated and has an axis; the members have their axes parallel but do not have constant cross-sections or parallel edges. They are held together by tension members extending through laterally extending holes in the members as indicated by broken lines 67.

Figure 22:
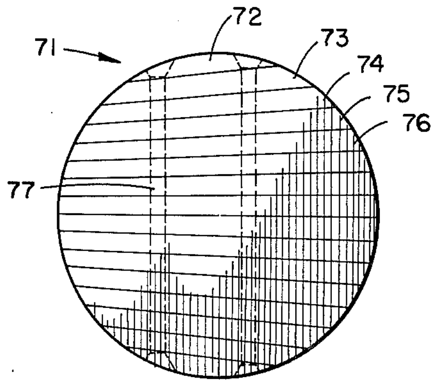
FIGURE 22 is a plan view of another modification of the embodiment of FIGURE 1.

As shown in FIGURE 22, float 71 in accordance with the invention may be provided by a number of members such as 72, 73, 74, 75 and 76, each of which is elongated and has an axis, each member being slightly wedge-shaped so that it does not have a constant cross-section and so that its axis is only substantially parallel rather than being exactly parallel to that of the next adjacent member on each side. Thus, in the embodiment of FIGURE 22, the axis of each of the elongated members 72, 73, 74, 75, 76, etc. is substantially parallel to that of each such member adjacent to it, but the axes of all the members cannot be said to be parallel one to the other. Projections 35 extending into recesses 36 are preferably provided for each member, to provide for desired alignment; the top and bottom of float 71, if the members 72–76 etc. have rectangular cross-sections, are thus caused to be substantially flat. Members 72–76 etc. are maintained in assembled form by tension members extending laterally therethrough indicated by broken lines 77. For simplicity, projections 35 and recesses 36 are not shown.

Figure 23:
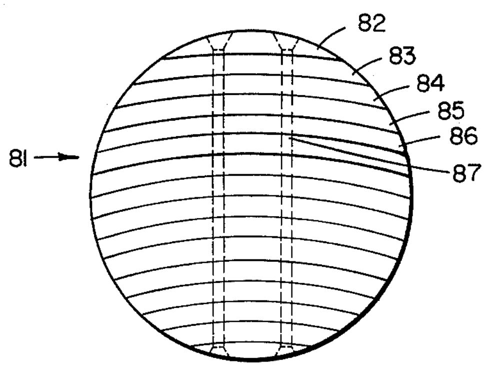
FIGURE 23 is a plan view of another modification of the embodiment of FIGURE 1.

Referring now to the embodiment of FIGURE 23, float 81 may be provided by a plurality of members such as 82, 83, 84, 85 and 86, each of which extends substantially from one outer peripheral edge to an opposite peripheral edge of the float, said members being held together by tension members (indicated at 87 in broken lines) which extend through the float, through lateral holes in each of the aforesaid members. Each of members 83, 84, 85 and 86 has a constant cross-section in a portion thereof which lies between its end portions which are at outer peripheral edges of the float. The lines of intersection between the members are arcs of congruent circles and in the sense that arcuate extensions of such arcs, in the same circles, never intersect, the edges of the members may be said to be parallel. Lines extending at 90° to members 87, which pass through the center of gravity of each member, may be defined as the axes of the members and such axes of all the members are parallel.

Figure 24:
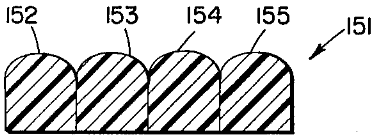
FIGURE 24 is a fragmentary cross-sectional view of a modification of the embodiment of FIGURE 1 taken from the point of view indicated by line 24—24 in FIGURE 1.

Referring now to FIGURE 24, it may be seen that it is not necessary to the invention that the cross-sectional shapes of the elongated buoyant members which provide the float, such as members 152, 153, 154 and 155, be rectangular. The cross-sectional shape may be elongated as shown to provide a flat bottom and a ridged top surface for a float, of which a portion is indicated generally as 151.

A flat bottom and a flat top are preferred but it is more desirable that the bottom be flat than that the top be flat, in order to avoid trapping air underneath the float. Air entrapped underneath the float tends to become dissolved in the water just as would air above the water, in the absence of the float, and thus such entrapped air reduces the efficiency of the float in preventing dissolving of air in the water which would necessitate recharging the accumulator with air.

Figure 25:
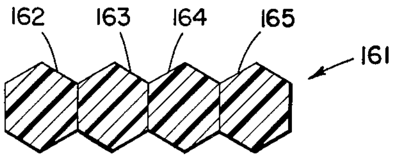
FIGURE 25 is a cross-sectional view corresponding to that of FIGURE 24, of another embodiment.

Referring now to FIGURE 25 there is shown another modification wherein the cross-sections of the elongated buoyant members such as members 162, 163, 164 and 165 are six-sided. Such an embodiment may be desirable in providing greater rigidity but is not preferred in view of the relatively greater likelihood of trapping small amounts of air underneath the float, of which a portion is indicated as 161. The channels adjacent and below each joint which extend from one outer peripheral edge to another provide for most, if not all, of such entrapped air to relatively easily escape from the ends of the channels, at the outer peripheral edges of the float.

Figure 26:
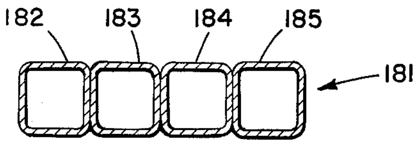
FIGURE 26 is a cross-sectional view corresponding to that of FIGURE 24, of another embodiment.

As shown in FIGURE 26, a plurality of elongated buoyant members 182, 183, 184, and 185 may be provided to make up a float, of which a portion is indicated as 181 wherein the members are hollow metal members rather than being members of buoyant material such as plastic foam indicated in other figures and as described hereinbelow.

Figure 27:
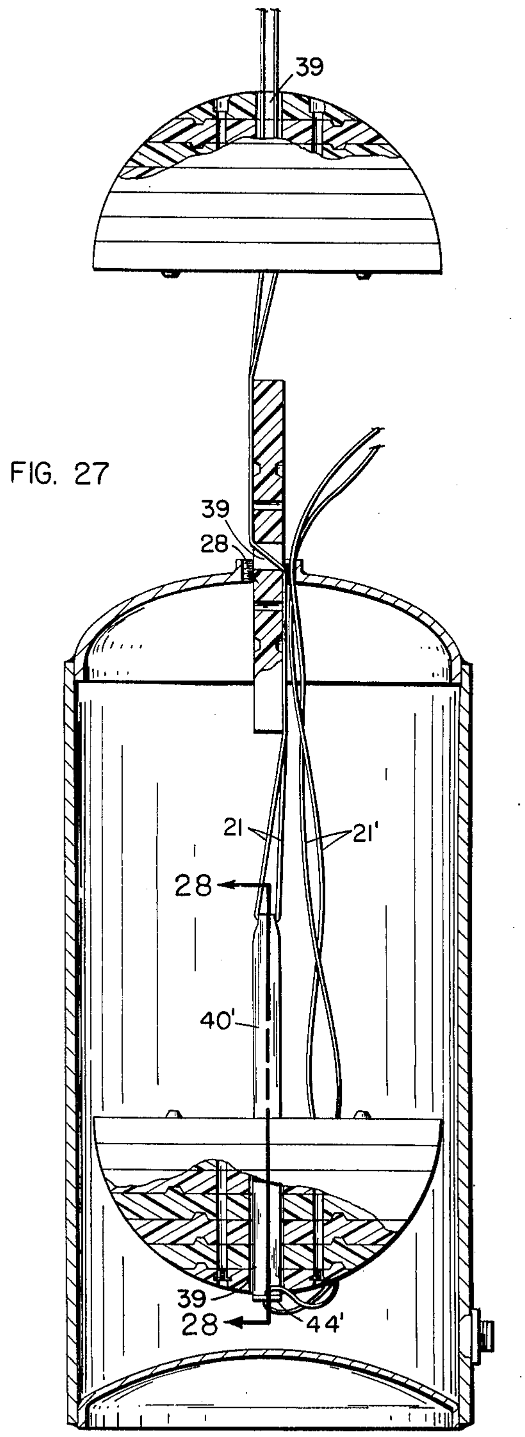
FIGURE 27 is a partially cut-away partially cross-sectional view of a step in the installation.
Figure 28:
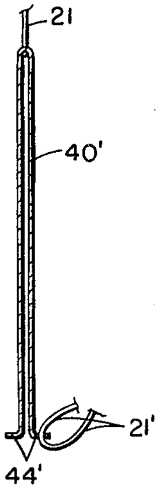
FIGURE 28 is a cross-sectional view taken on line 28—28 in FIGURE 27.

Referring now to FIGURES 27 and 28, there is shown another embodiment wherein members which correspond to (but are not necessarily identical to) those of FIGURE 9 may be installed in a tank by means of first threading them on cord 21 and then through an aperture in the tank, in the manner described in connection with FIGURE 4, then allowing them to pass downwardly onto elongated metal member 40′ so that the lowest member is caught and retained by extending portions 44′ at the bottom of member 40′. Cord 21 serves to guide the members into the proper relationship to member 40′ so that member 40′ is received in rectangular holes 39 in the members. After all the members are in place and bolts 17′ (not shown) have been installed as described in connection with FIGURE 9, cord 21′ may be pulled upwardly and cord 21 somewhat released so that portions 44 are presented upwardly, whereupon cord 21 may be entirely released and cord 21′ may be further pulled out of the tank to first withdraw member 40′ and then cord 21 from holes 39 in the float and then from the tank through hole 28.

Figure 29:
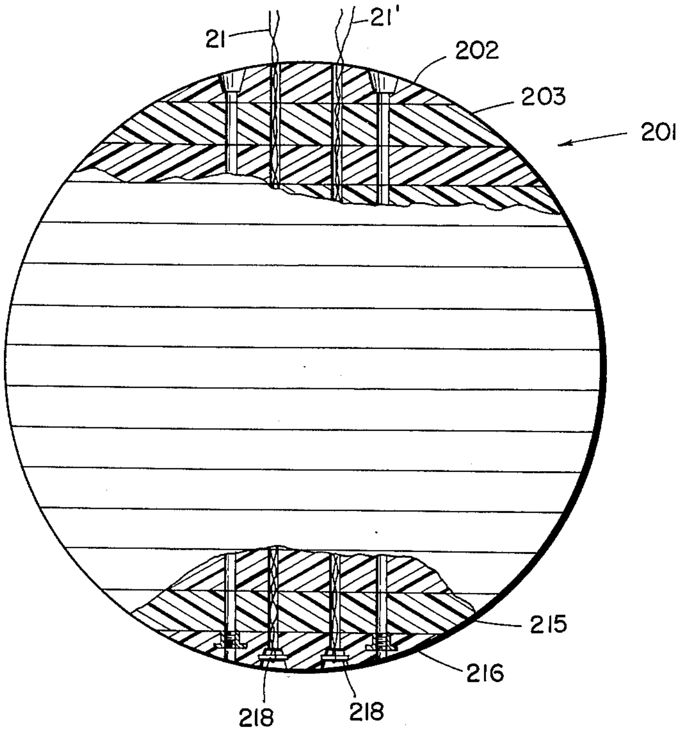
FIGURE 29 is a partially cut-away plan view of another embodiment.

FIGURE 29 shows another embodiment wherein float 201 is provided by members 202, 203, etc. to 215 and 216. Member 216 may be provided with members to threadedly receive bolts 17′ (not shown) as in the embodiments of FIGURE 9 and FIGURE 27. Float 201 may be installed in a tank by providing recesses in member 216 having pins 218 extending laterally therein. Cords 21 and 21′ may be threaded as shown. Then with the bolts absent, member 216 may first be inserted through hole 28 and then 215 may be inserted and the other members successively inserted, as in the manner of FIGURES 4, 5 and 27, until members 202 and 203 are inserted, the members being guided into proper alignment by the cords. Thereupon float 201 may be drawn upward against hole 28 by member 21, and a bolt 17′ (not shown) may be inserted through the hole next to string 21 and screwed tight. The float may then be drawn against hole 28 by cord 21′ and the other of the bolts inserted in the hole next to 21′. One end of each cord 21 and 21′ may then be released and the other end of each withdrawn through hole 28; thereupon float 201 will drop into the tank and, when water is in the tank, will float in the position indicated in FIGURE 2.

Figure 9:
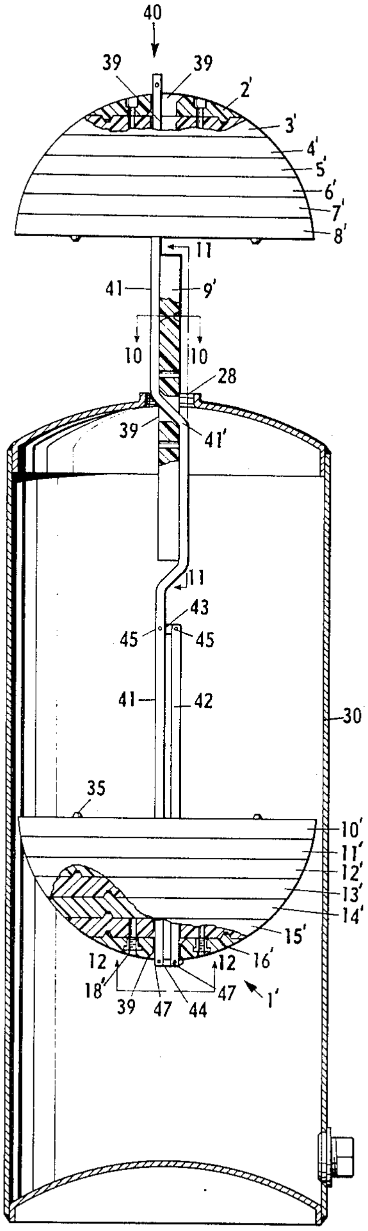
FIGURE 9 is a partially cross-sectional, partially cutaway elevation of one step in installing another embodiment in a tank.
Figure 10:
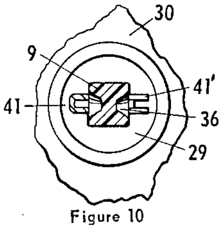
FIGURE 10 is an enlarged fragmentary cross-sectional view taken on line 10—10 in FIGURE 9.
Figure 11:
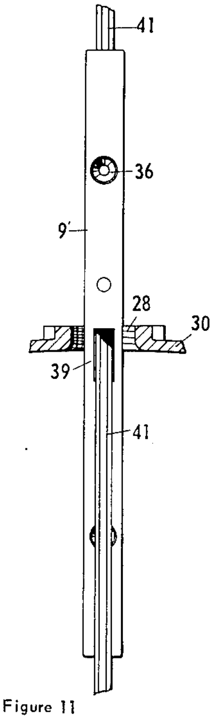
FIGURE 11 is enlarged fragmentary partially cross-sectional elevation taken from the point of view of line 11—11 in FIGURE 9.
Figure 14:
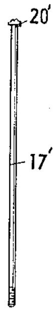
FIGURE 14 is an elevation of a part used in conjunction with the device of FIGURE 9.
Figure 13:
FIGURE 13 is an elevation of one portion of the device of FIGURES 9 and 12.
Figure 12:
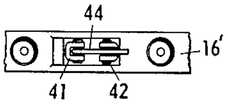
FIGURE 12 is an enlarged fragmentary view taken from the point of view of line 12—12 in FIGURE 9.
Figure 30:
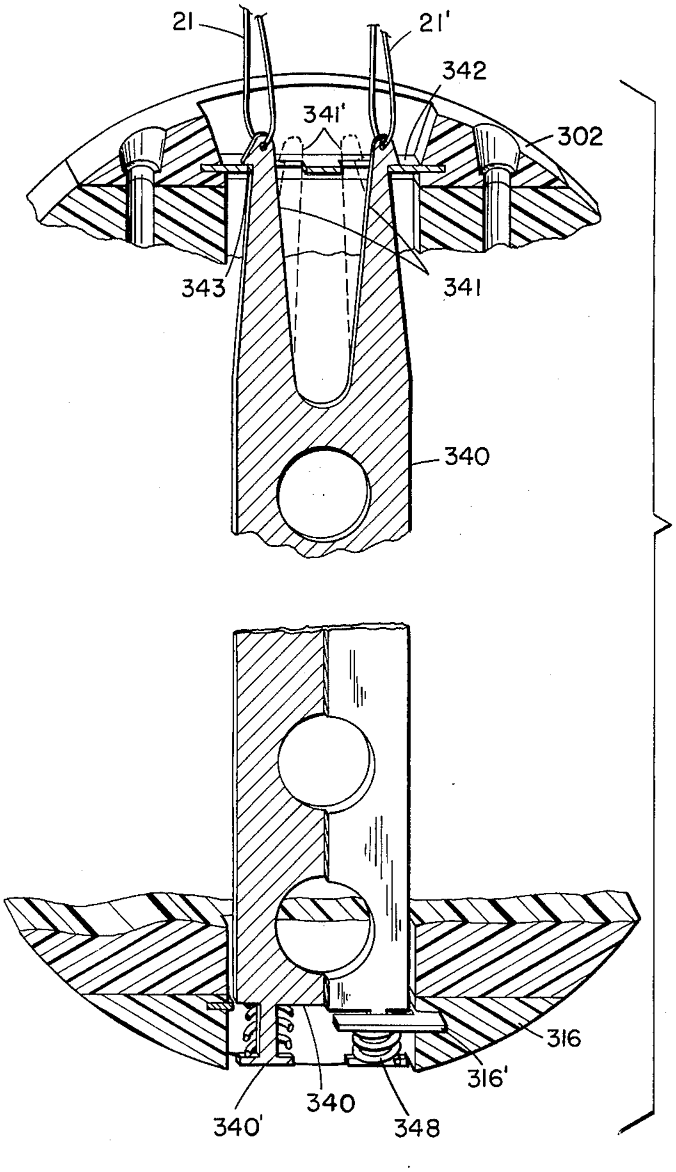
FIGURE 30 is a partially cut-away perspective view of a modified embodiment of a device for inserting slightly modified float members of FIGURE 9.

Means is shown in FIGURE 30 for inserting members which correspond to those of the float of FIGURE 9. Elongated member 340 is first dropped into the tank by cords 21 and 22′ which are attached thereto as shown and the lowermost member of the float is inserted through hole 28 in the manner described in connection with FIGURE 29 and very much as shown in FIGURES 4, 5 and 27. After it is within the tank, it slides downward on the cords until upwardly extending portions 341 of member 340 are received in the laterally extending rectangular hole in the member, and then slides downward on member 340 (while extending laterally) until caught and retained by springs 348 which may be supported on lower extending portions 340′ of member 340 and may engage plate 316′ embedded in lowermost member 316. By providing a pair of strings, namely strings 21 and 21′, each of the elongated float members is caused to be aligned with members 341 so that members 341 are received in the laterally extending hole in the member after it is inserted through aperture 28. After all of the members have been inserted in the proper order through hole 28, cords 21 and 21′ or either of them may be withdrawn upward through hole 28 to cause member 340 to move upward to cause the uppermost member 302 of the elongated members to be received against the interior surface of the tank adjacent hole 28 and to cause member 340 to be drawn upward with respect to the members, compressing springs 348 which may be compression coil springs as shown and forcing members 341 into the position shown by broken lines 341′ whereupon they slide through holes 342 in the uppermost elongated member and then spring outwardly so that latch portions 345 latch against edges of holes 342 in flat metal plate 343 which may be embedded in the uppermost member 302.

Figures 31, 32:
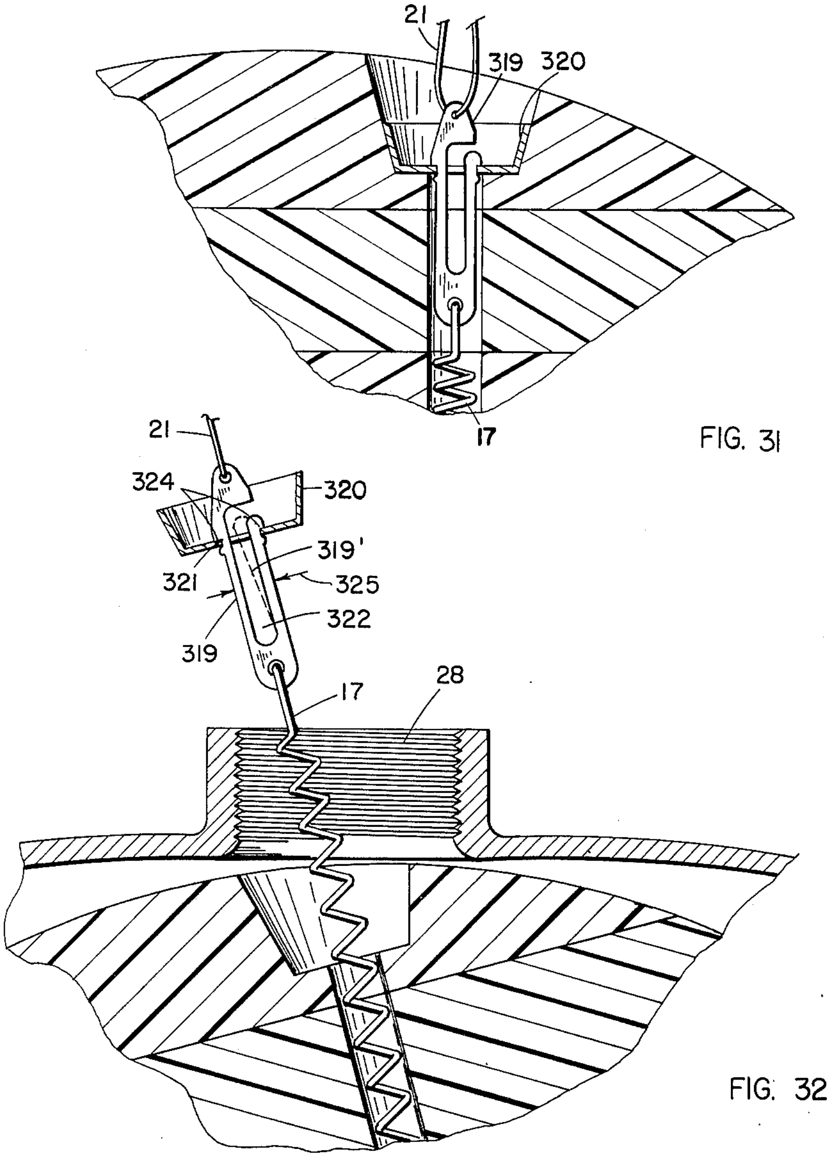
FIGURE 31 is a partially cross-sectional elevation of a device which may be used in place of parts 19 and 20.
FIGURE 32 is a perspective view of the device of FIGURE 31, in use.

A device is shown in FIGURES 31 and 32 which may be utilized in place of locking member 19 and washer 20 in installing the embodiments of FIGURES 1 to 5 and 15 to 18. Member 319 may be provided with indentations in its outer surface at 321 to receive cup-like member 320 (in place of which a washer may be used, if desired). Member 319 may be provided with holes, as shown, to receive cord 21 and spring 17, the holes being preferably near each end, and may be provided with a longitudinally extending central slot 322 which may extend from one end to near the other end. It may be provided with tooth or latch portions extending at 324 to engage member 320. When member 319 is withdrawn from the tank by pulling on cord 21, as shown in FIGURE 32, finger pressure may be exerted as shown by arrows 325 to cause the slot 322 to be somewhat closed and cause the device to have the configuration indicated by broken lines 319' so that portions 324 are pressed together and washer-like member 320 may be slipped over members 324, over the top of the device, and over string 21.

Members 21 and 21' are referred to hereinabove as cords or strings or the like but may be any flexible strands which are suitable, such as braided or twisted filametary wire strands, or multi-filament or mono-filament, continuous filament or staple fiber yarns of synthetic or natural materials such as nylon, rayon, cotton or the like.

The elongated buoyant members have been suitably made of foamed polystyrene having a density of about 10 pounds per cubic foot; this material has been found to have sufficiently high compressive strength to suitably resist being deformed (with resultant loss of buoyancy) by the pressures of 20 to 40 p.s.i. which are normally utilized in water-air accumulators of the type for which the float is particularly well suited. Other buoyant materials might suitably be used such as foamed polyurethane, foamed polyvinylchloride, cellular hard rubber, cork or the like.

The action of the float is to serve as a barrier between the surface of the water and the air above the water. It prevents contact of the air with the water over most of the water surface and, since molecules of air cannot enter the water and dissolve therein where the air is not in contact with the surface, the use of the float enormously decreases the amount of air which becomes dissolved in the water. By reason of the float having preferably a clearance of 1/32 inch from the interior wall of the accumulator tank in which it is used, the only water surface with which the air is in contact is that between the output peripheral layer of the float and the inner wall of the tank. It is preferred that the clearance not be greater than one inch in order to minimize the surface of the water with which the air is in contact. It is preferred that the clearance be not less than 1/32 inch in order to minimize the possibility of the float frictionally engaging the walls of the vessel with sufficient force to prevent the float from suitably moving up and down with the water level, that is, floating freely on the water in the tank.

In some tanks the ends of pipes may protrude into the tank or bosses which are welded into the tank wall and threaded to receive the pipes may extend somewhat into the tank. The float, as it moves up and down in accordance with the change of water level in the tank, may in some instances catch on said projections. This is objectionable and it is generally preferable to provide an interior surface free of such projections but if such projections are present and the float does catch such projections, the utility of the float, though diminished, is not diminished greatly. Normally, as the float moves upward past such a projection and catches on it, if the water level is increasing, the float will begin to assume an angular position and after the angle becomes sufficiently great its angularlity will cause it to slip off the projection and float freely to the top of the water. Likewise, when the water level is diminishing, if one edge of the float catches on such projection the float will adopt an angular position and the angle will increase until the float slides downward off the projection and again floats freely on the surface of the water.

It may thus be seen that the invention is broad in scope and includes such modifications as will be apparent to those skilled in the art and is to be limited only by the claims.

Having thus described my invention, I claim:

1. The method of installing in a tank adapted to contain liquid, a float comprising a plurality of elongated float members comprising lowering a thin elongated member through an aperature in the tank which has a small diameter relative to the major internal lateral dimension of the tank, threading said thin elongated member through a lateral hole in each of said elongated float members, moving each of said elongated float members successively endwise downwardly through said hole in said tank while engaged with said thin elongated member, retaining the first of said float members in a laterally extending position with respect to said thin elongated member and retaining each succeeding float member in a laterally extending position against the next previous float member, installing a fastening member through laterally extending holes in said float members to hold said float members together and provide said float, and removing at least a portion of said thin elongated member.

2. A method of installing a float in a tank adapted to contain liquid comprising lowering through a hole in the tank a thin elongated resilient tension member attached to a flexible strand, said hole having a small diameter relative to the major internal lateral dimension of the tank, threading said strand through a lateral hole in each of a plurality of elongated float members, threading each of said elongated float members successively endwise downwardly on said strand through said hole in said tank, and then downwardly on said thin resilient members, then retaining the first of said float members in a laterally extending position at the bottom end of said thin resilient member and then retaining each succeeding float member in a laterally extending position against the next previous float member, fastening the upper end of said resilient member against the uppermost of the float members to stretch said resilient member and maintain it in a stretched position to bias said float members together, and then removing said strand.

3. The method of installing a float in a tank adapted to contain liquid, comprising lowering a coil spring attached to a flexible strand through a hole in the tank which has a small diameter relative to the major internal lateral dimension of the tank, threading said flexible strand through a lateral hole in each of a plurality of elongated float members, threading each of said elongated float members successively endwise downwardly on said strand through said hole in said tank and then downwardly on said spring, retaining the first of said float members in a laterally extending position at the bottom end of said spring and each succeeding float member in a laterally extending position against the next previous float member, attaching a member to said spring to cause said spring to bias said members together and then removing said strand.

4. The method of installing a float in a tank adapted to contain liquid, comprising lowering through a hole in the tank two coil springs each attached to a string so that said strings extend into said tank through said hole, said hole having a small diameter relative to the major internal lateral dimension of the tank, threading said strings through laterally extending holes in each of a plurality of elongated float members, threading each of said elongated float members successively endwise downwardly on said strings through said hole in said tank, and thence downwardly on said springs, in a laterally extending position, catching the first of said float members on retainer means at the bottom ends of said springs and retaining each succeeding float member in laterally extending position against the next previous float member, stretching each of said springs and installing retainer means at the upper end of each spring to act against the uppermost float member to cause said springs to biasedly urge said members together to form said float, and then removing said strings.

5. The method of installing a float in a tank adapted to contain liquid comprising inserting through a hole in the tank a rigid member having a bend therein and having a latch at its lower end, said hole having a small diameter relative to the major internal lateral dimension of the tank, threading the upper portion of said rigid member through a laterally extending rectangular hole in each of a plurality of elongated float members, successively turning each of said elongated float members to extend upward and downward adjacent said rigid member so that said bend in said member extends through said hole, lowering said rigid member to thread said float member through said hole, passing said float member in a lateral position downwardly along said rigid member, retaining the first of said float members at the bottom end of said rigid member with said latch and retaining each succeeding float member in a laterally extending position against the next previous float member, installing at least one retaining member through laterally extending holes in said float members to hold said float members together to provide said float, disengaging said latch and removing said rigid member.

References Cited by the Examiner

UNITED STATES PATENTS

| | | | |
|---|---|---|---|
| 1,674,039 | 6/1928 | Glass | 220—26 |
| 2,307,508 | 1/1943 | Jayne | 220—26 |
| 2,848,799 | 8/1958 | Hanna | 29—429 |
| 2,867,346 | 1/1959 | Champagnat | 220—26 |
| 2,919,047 | 12/1959 | Fino | 220—26 |
| 2,975,512 | 3/1961 | Somes | 29—429 |
| 3,029,971 | 4/1962 | Reynolds | 220—26 |
| 3,049,261 | 8/1962 | Wade et al. | 220—26 |

WHITMORE A. WILTZ, *Primary Examiner.*

THERON E. CONDON, *Examiner.*